June 8, 1943.  A. W. TONDREAU  2,321,336

VALVE

Filed Aug. 10, 1942

ALBERT W. TONDREAU,
INVENTOR.

BY W. E. Beatty
ATTORNEY.

Patented June 8, 1943

2,321,336

UNITED STATES PATENT OFFICE 2,321,336

VALVE

Albert W. Tondreau, Hollywood, Calif.

Application August 10, 1942, Serial No. 454,243

7 Claims. (Cl. 251—18)

The invention relates to a valve for controlling the flow of fluid. While the valve of this invention is particularly adapted for controlling the flow of air for an air-conditioning system in an aircraft, it may be employed to control the flow of other fluids or liquids.

Certain types of valves which are entirely satisfactory for use in stationary or slowly moving situations, may prove to be wholly unsatisfactory when used in aircraft, due to the excessive amount of vibration encountered. This vibration may cause failure of the valve due to crystallization of its vibrating parts, or in other cases it may disturb the setting of the valve.

An object of the present invention is to overcome these defects and provide a valve which is substantially free from vibrating parts, or technically speaking, having moving parts, the natural period of vibration of which is so high as to be substantially unaffected by the vibration of the aircraft.

A further object of the invention is to make it possible to readily adjust the valve to control the flow of fluid, while impositively locking it in its adjusted position in such a manner that the vibration of the aircraft will not affect the operation of the lock, or disturb the adjustment of the valve.

The above and other objects are accomplished by the use of an iris type valve which broadly speaking is old, and which I have improved in a number of respects to adapt it to its intended use. As an iris type valve is adjusted to have varying degrees of valve opening, there is a variation in the thickness in the stack of leaves along the axis of the valve. One of the improvements comprises a common tensioning means for compressing the stack of leaves to keep them compact even though the height of the stack varies and for impositively locking the valve in its adjusted position, and this, regardless of whether the lock is positioned outside of the valve casing, or whether as in the preferred form, it is inside of the valve casing.

Another feature of the invention relates to an arrangement for sealing off the casing from flow of the air or fluid being controlled, through the aperture in the casing where the operating handle projects.

Another object of the invention relates to an iris type valve and to the provision of a casing therefor in the form of two casing elements which are identical except for a slight amount of machine work on one of them to provide a slot for the operating handle.

Other objects of the invention will be apparent from the description in connection with the drawing wherein Fig. 1 is a vertical sectional view, with certain parts in full, of a valve according to the present invention.

Figure 1:
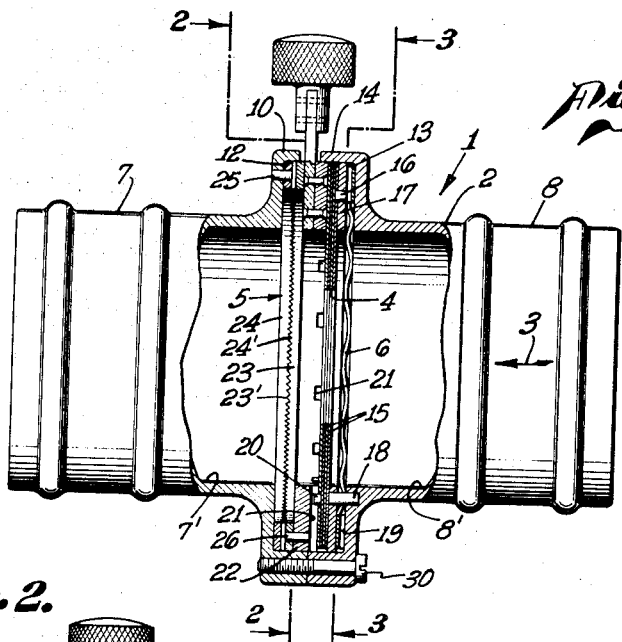

Referring in detail to the drawing, the valve 1 is adapted to control the flow of fluid, and is particularly adapted to control the flow of air, for example in an air-conditioning system, and under circumstances where excessive vibration is encountered, as on an aircraft.

Figure 2:
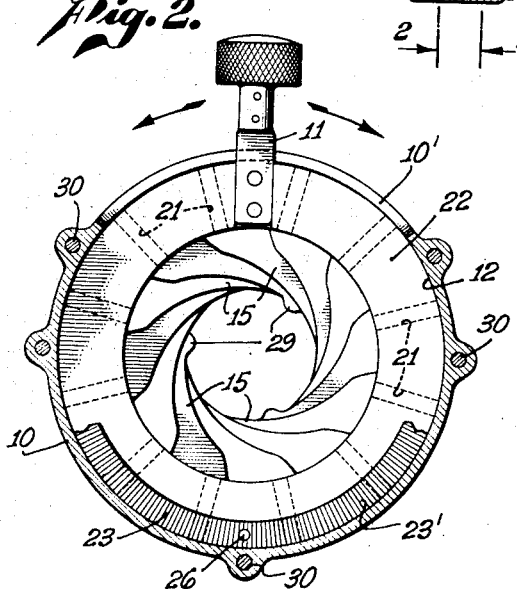
Fig. 2 is a sectional view on line 2—2 of Fig. 1 looking in the direction of the arrows.
Figure 3:
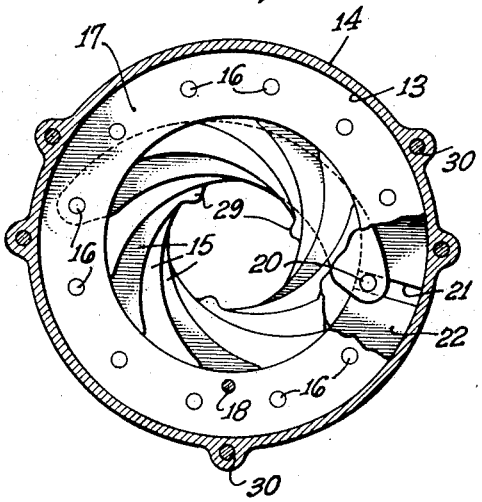
Fig. 3 is a sectional view on line 3—3 of Fig. 1 looking in the direction of the arrows.

The direction of flow through the valve 1 may be suitably marked on the valve casing 2, and is preferably in a direction from right to left as seen in Fig. 1 as indicated by the arrow 3, in order that the air pressure will have a tendency to assist spring 6 in holding the lock 5 in locked position. The casing 2 comprises two coupling sections 7 and 8 which are held by screws or bolts 30. Sections 7 and 8 are tubular in form and have a central passageway 7' and 8'. The sections 7 and 8 are substantially identical, except that the flange 10 on the section 7 has been cut away over an arc of about 90° as shown at 10' in Fig. 2, in order to provide a slot for the valve handle 11. Hence sections 7 and 8 can be cast from the same pattern. The flange 10 is of larger diameter than the main part of the section 7, to provide an annular recess 12 which fits end to end with a similar recess 13 inside of the flange 14 on the coupling section 8. The recesses 12 and 13, with flanges 10 and 14 fitted end to end as shown, together form a space in which the iris valve 4 and its component parts are mounted. These parts comprise a plurality of iris leaves indicated at 15, and twelve of which are here shown, although any other suitable number could be used. The leaves 15 have fixed pivots at one end thereof as indicated by the pins such as 16 which are equally spaced around the ring 17 which is slidingly mounted on the pin 18 secured to the flange 14. The pin 18 prevents the ring 17 from rotating, while permitting the ring to move slightly along the axis of the casing 2, under action of the marcel spring 6 which is of ring form and positioned between the face 19 of the flange 14, and the adjacent face of the ring 17. The spring 6 performs the two-fold function of keeping the leaves 15 compressed and of taking up play in them due to the fact that the effective thickness of the leaves 15 along the axis of the casing 2 varies as the leaves are stacked more or less on top of each other to open or close the valve, and of holding the lock 5 closed. The other ends of the leaves such as 15 each carry a pin as indicated in Fig. 3 at 20, these pins such as 20 sliding in radial slots as indicated at 21, in an operating ring 22, to which the handle 11 is suitably secured. There are twelve equally spaced slots such as 21, one for each of the movable ends of the leaves 15.

The handle 11 is preferably let into one side of the operating ring 22 so that the uniform thickness of the operating ring 22 is not affected by the presence of the handle 11, to simplify the manner of preventing fluid flow through the slot 10', the outside diameter of operating ring 22 making a close bearing fit against the inside periphery of the recesses 12 and 13 in the flanges 10 and 14. On the left side of the operating ring 22 I secure a lock ring 23 having a series of small uniformly spaced notches 23' which interfit with similar notches 24' on a stationary lock ring 24 which is secured in the recess 12 by the lock pin 25. The lock ring 23 may be suitably secured to the operating ring 22 by pins such as 26. The marcel ring spring 6 permits the peaks of the notches 23' and 24' to ride over each other when the handle 11 is manipulated to vary the opening of the leaves 15, the lock ring 23, the operating ring 22, the leaves 15, and the pivot ring 17 all being slidable to the right along the axis of the casing 2, in the annular recesses 12 and 13 in which the lock ring 23, operating ring 22 and pivot ring 17 all have a sliding bearing fit, the ring 17 being slidably mounted on pin 18 as before stated.

The slot 10' is sealed off as the outside diameter of lock ring 23 is the same as the operating ring 22, and these two rings at their periphery bridge the slot 10' as shown in Fig. 1, thereby preventing the fluid in the valve 1 from leaking through the slot 10'.

Figure 4:
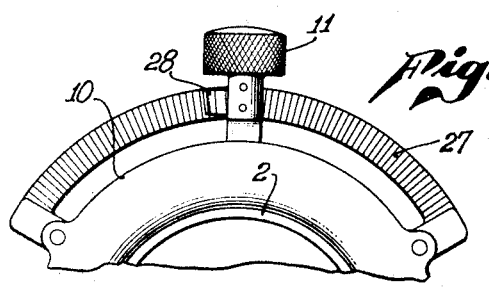
Fig. 4 is a view in elevation of a modified type of lock.

The lock 5 is housed within the casing 2 and is therefore not exposed outside of the casing. It is exposed to the fluid controlled by the valve, but this is not objectionable in the case of air. If it were desired to control the flow of a corrosive liquid, or if for any other reason it is desired to have an external lock this may be provided as indicated in Fig. 4 wherein the casing 2 is provided with a notched rack 27 with which a spring detent 28 cooperates, the spring detent 28 being mounted on the handle 11. The rack 27 is preferably secured on the flange 10, so that the marcel spring 6 in this case also would serve to hold closed the impositive lock formed by the rack 27 and the detent 28.

Preferably the coupling sections 7 and 8 are made of aluminum for aircraft use, while the leaves 15 are made of phosphor bronze, or other suitable metal.

Preferably certain of the leaves, for example the fourth, eighth and twelfth of the leaves 15 is each provided with an inwardly radially extending portion 29, so that the three portions 29 will overlap to more effectively seal off the center of the valve when the valve is moved to closed position.

The construction of the above valve is such that there are no parts which would tend to vibrate and crystallize under conditions found in aircraft, nor would such vibration disturb the setting of the valve, the spring 6 having sufficient tension to hold the valve locked under all vibrating conditions, while permitting the pivot ring 17 to slide on pin 18 and accommodate a varying thickness of the leaves 15 as they are stacked and unstacked when varying the valve opening.

It will be apparent that various modifications may be made in the invention without departing from the spirit of the following claims.

I claim:

1. A valve comprising a casing having a fluid passage, an iris valve having adjustable leaves controlling said passage, an adjustable impositive lock for said leaves, and common tensioning means operable to compress said leaves and hold said lock in adjusted position.

2. A valve according to claim 1 wherein said lock comprises a pair of rings in said casing coaxial with said passage, said rings having interfitting notches, means for securing one of said rings to said casing, an operating ring for said leaves, and means for securing the other of said pair of rings to said operating ring.

3. A valve comprising a casing having a fluid passage, an iris valve having adjustable leaves controlling said passage, an oscillatable ring for adjusting said leaves, a nonoscillatable ring having fixed pivots for said leaves, means providing for sliding movement of said last mentioned ring along the axis of said passage, and tensioning means acting on said last mentioned ring to compress said leaves.

4. A valve according to claim 3 wherein said casing has an annular recess around said passage, said tensioning means comprising a marcel ring in said recess.

5. A valve comprising two substantially identical conduit coupling sections each terminating in an outwardly extending flange having an internal annular recess, means securing said flanges end to end to form a casing having a fluid passage with said recesses in register and forming an annular valve recess coaxial with said passage, an iris valve mounted in said valve recess, an operating ring in said valve recess for said valve, a handle on said ring, one of said sections having a slot to slidably receive said sandle, a stationary lock member in said casing and a cooperating lock ring on said operating ring, said operating ring and said lock ring fitting in said valve recess and bridging said slot to seal said slot from fluid flow.

6. A valve comprising a valve casing having a passage therethrough, a valve movable across said passage, means movable about the axis of said passage for operating said valve, and an annular impositive lock means for said valve around said passage inside of said casing.

7. A valve according to claim 3 comprising an operating member on said valve, said casing having a slot to permit said member to oscillate around said passage and move axially of said passage, and means associated with said iris valve for bridging said slot to seal said slot from fluid flow.

ALBERT W. TONDREAU.